United States Patent [19]

Bauer

[11] 4,093,196
[45] June 6, 1978

[54] LENGTH-ADJUSTABLE GAS SPRING

[75] Inventor: Fritz Bauer, Altdorf, Germany

[73] Assignee: Suspa Federungstechnik Fritz Bauer & Sohne OHG, Altdorf, Germany

[21] Appl. No.: 825,463

[22] Filed: Aug. 17, 1977

[30] Foreign Application Priority Data

Aug. 26, 1976 Germany .............................. 2638363

[51] Int. Cl.² .............................................. F16F 9/32
[52] U.S. Cl. ................................... 267/65 R; 188/300; 248/400
[58] Field of Search ................... 267/65 R, 65 D, 113, 267/118, 124, 131; 248/354 H, 400; 297/355; 188/300, 313

[56] References Cited

U.S. PATENT DOCUMENTS

| 3,656,593 | 4/1972 | Bauer | 188/300 |
| 3,966,182 | 6/1976 | Stadelmann et al. | 188/300 |
| 3,979,109 | 9/1976 | Ishida | 188/300 |

FOREIGN PATENT DOCUMENTS 2,547,664  4/1977  Germany ........................... 267/65 R Primary Examiner—Trygve M. Blix
Assistant Examiner—Edward R. Kazenske
Attorney, Agent, or Firm—Browdy and Neimark

[57] ABSTRACT

A length-adjustable gas spring is provided with a by-pass valve comprising a piston sealing element and a depression in the inner tube of the gas spring so that when the piston sealing element is pushed to a position adjacent the depression, the valve is opened.

6 Claims, 2 Drawing Figures

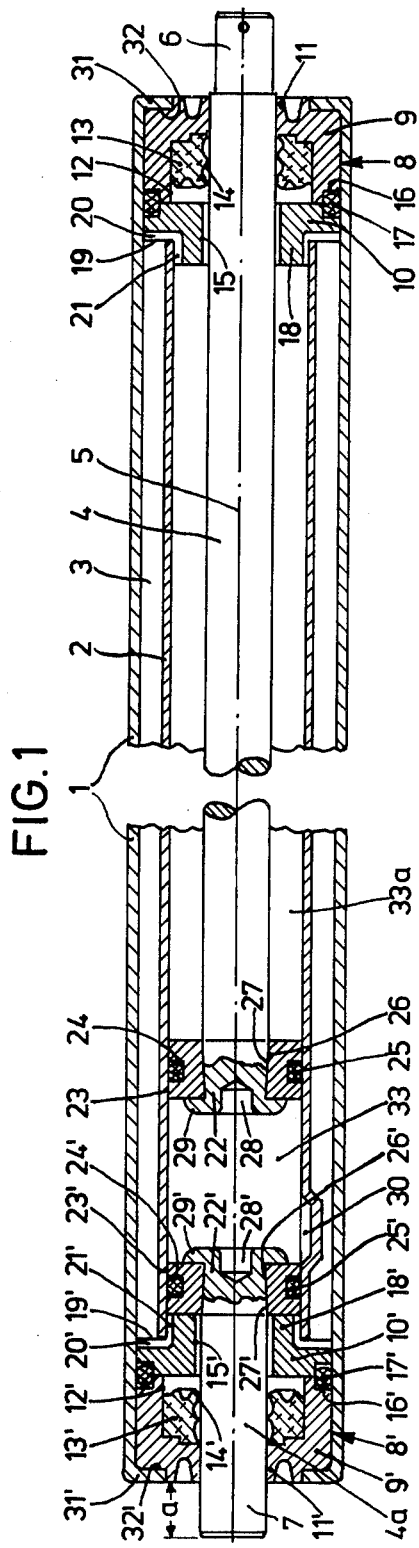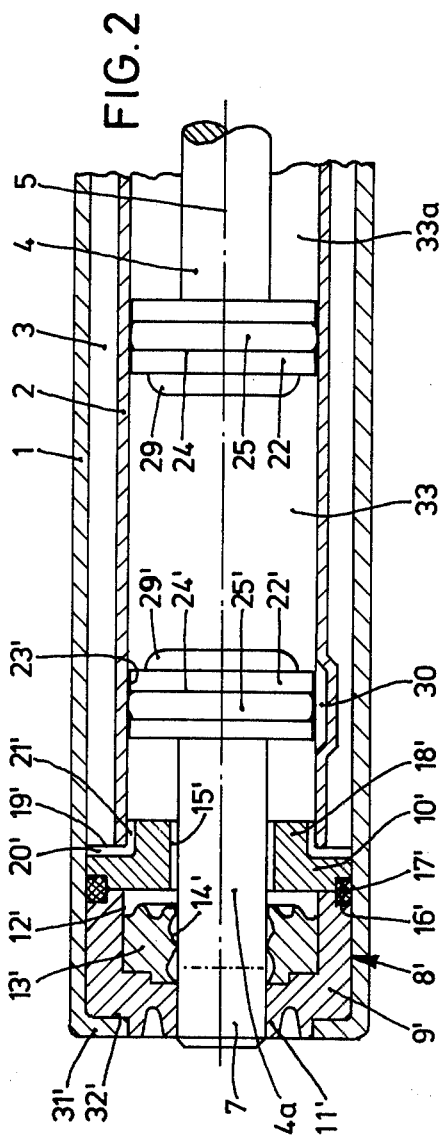

LENGTH-ADJUSTABLE GAS SPRING

FIELD OF THE INVENTION

The invention relates to length-adjusting means, and, more particularly, to a continuously length-adjustable gas spring, especially for height adjustment of chair seats, table tops or the like.

Thus, the invention is particularly concerned with such devices having two cylindrical tubes fitted together concentrically, filled with compressed gas, and connected by at least two bypass channels, the outer of said tubes forming the housing, with a piston mounted coaxially displaceably in the inner tube and fitting against the inside wall of the latter with a seal, said piston being connected to a piston rod extending through one end of the housing in a gas-tight manner through a sealing plug, and with a sealing plug closing the two tubes at the opposite end in a gas-tight manner, in which a valve push rod serving as a release pin for a valve is supplied for providing communication between the housing chambers, separated from one another in a gas-tight manner by the piston on the piston rod in the inner tube, via a bypass channel located in the vicinity of the valve push rod, via bypass channels located in the vicinity of the sealing plug, and via an annular chamber located between the inner tube and the outer tube, whereby a seal is provided, said seal being bridged by the bypass channel when the valve push rod is in the push-in position.

BACKGROUND OF THE INVENTION

In a length-adjustable gas spring of this type, known from U.S. Pat. No. 3,656,593, and 3,711,054, the valve push rod is provided with an annular groove, located approximately in the center of the sealing plug, and serving as a bypass channel, by means of which annular groove a seal disposed facing the inner chamber of the housing and located in the sealing plug is bridged when the valve push rod is in the pushed-in position. A plate or thickening is provided at the inner end of the valve push rod, which, when the valve push rod is in the push-out position, in which the valve is closed, rests as a stop against the sealing plug, thus preventing the valve push rod from being pushed completely out of the gas spring. This known gas spring has proven extraordinarily reliable in practice; however, it has the disadvantage that the cost of manufacture is relatively high.

SUMMARY OF THE INVENTION

Therefore, an object of the invention is to improve a gas spring of the type described above in such manner that the cost of manufacture is considerably reduced. Other objects of the invention include the obviation of deficiencies in the prior art and the provision of improved gas springs.

These objectives are achieved according to the invention by virtue of the fact that the sealing element of the valve is formed by a piston which is mounted in a gas-tight fashion against the inner end of the valve push rod and rests in a gas-tight but displaceable fashion against the inside wall of the inner tube, and by the fact that the bypass channel in the inside wall of the inner tube is located in the travel path of the piston of the valve push rod. Therefore, conceptually, a key feature of the invention is the fact that the valve itself is displaced from the sealing plug on the valve side into the area of the inner tube adjacent to this sealing plug. As a result, the two sealing plugs of the gas spring, which are an important factor in gas spring manufacture owing to the cost of manufacturing them with their seals, can be made absolutely identical to one another. This design also results in the fact that the two pistons, namely the piston mounted on the piston rod and the piston rod and the piston mounted on the valve push rod, can be made absolutely identical to each other, since they are both guided in a gas-tight manner in the inner tube, and since they both are provided with no other gas openings of any kind. Finally, the piston rod on the one hand and the valve push rod on the other, aside from their different lengths, can be made completely identical. Aside from the bypass channel located only in the vicinity of the valve in the inner tube, the gas spring according to the invention can therefore be made completely symmetrical, i.e., the number of different parts required for its manufacture is practically cut in half.

BRIEF DESCRIPTION OF THE DRAWING

Further advantages and features of the invention will be apparent from the following description of an exemplary embodiment with reference to the drawing, wherein FIG. 1 is a lengthwise section through a gas spring according to the invention with the valve closed, and FIG. 2 is a partial lengthwise section through the valve area with the valve open.

DETAILED DESCRIPTION OF THE PREFERRED EMBODIMENT

The lengthwise adjustable gas spring shown in the drawing is provided with a cylindrical housing 1, wherein a likewise cylindrical inner tube 2 is coaxially disposed, whereby an annular chamber 3 is formed between the outer tube forming the housing 1 and the inner tube 2.

A similarly cylindrical piston rod 4 is mounted coaxially in inner tube 2, said rod being displaceable in the direction of axis 5 of housing 1. One of its ends 6 (the outer end) is located outside the cylindrical housing 1.

In the vicinity of the end of cylindrical housing 1 opposite the end through which the rod 4 projects, a valve push rod 4a also coaxial to the housing 1, made in the form of a cylindrical rod, is mounted displaceably in the direction of axis 5, its outer end 7 likewise being located outside housing 1. The piston rod 4 and the valve push rod 4a are each guided in a sealed manner in completely identical respective sealing plugs 8 and 8' in the vicinity of the corresponding ends of the cylindrical housing 1. In the description which follows, therefore, all parts which relate to valve push rod 4a are given the same reference numbers as the parts of piston rod 4, except that a prime is added to them.

Each sealing plug, 8, 8' consists of a generally cup-shaped part 9, 9' located axially and outside, and a cylindrical flanged part 10, 10' located axially inside. The parts 9 and 9' located outside are provided with a coaxial bore, whose diameter is approximately equal to the diameter of piston rod 4 and the identical diameter of valve push rod 4a, thus forming a guide sleeve 11 or 11' for piston rod 4 or valve push rod 4a. A recess 12 or 12' in the form of an annular groove is provided in conjunction with these guide sleeves 11 and 11', said recess being open to the adjacent part 10 and 10' located inside. A seal 13 or 13', which fits tightly against the walls of recess 12 and 12', is fitted into this recess 12 and 12', said seal resting with its sealing lips 14 and 14' against piston rod 4 or valve push rod 4a, thus producing a gas-tight seal between the outside part 9 or 9' of sealing plug 8 or 8' and the piston rod 4 or valve push rod 4a guided axially movably therein.

The inside parts 10 and 10', resting against respectively the outside parts 9 and 9', serve to close the recesses 12 and 12'. The parts 10 and 10' are each also provided with a coaxial bore 15 and 15', whose diameter, however, is slightly larger than the diameter of piston rod 4 and valve push rod 4a. The outside parts 9 and 9' and the inside parts 10 and 10', in the areas which are in contact with each other, are each provided with an annular groove of half width in the axial direction, said grooves becoming together a full width annular groove 16, 16' running completely around the outside (when the outer parts 9 and 9' and the inner parts 10 And 10' are fitted together). A sealing ring 17 or 17' is inserted into this annular groove 16, said ring resting in a gas-tight sealing manner against all three walls of annular groove 16 and against the inside wall of the cylindrical housing 1. The seals 13 and 13' and sealing rings 17 and 17' make the gas spring absolutely gas-tight at both ends of its housing 1.

The inside parts 10 and 10' are each provided with a cylindrical plug 18, 18' projecting into the interior of the cylindrical housing 1, and a stop 19 extending radially. The outside diameter of cylindrical plugs 18 and 18' is approximately equal to the inside diameter of inner tube 2, so that such tube, after the plug 18 or 18' has been pushed into the end of the inner tube 2, is held radially against the corresponding inside part 10 or 10' of sealing plug 8 or 8', and is held axially with respect to housing 1 by virtue of its pressure against the stop 19 or 1'. Radially extending depressions 20 and 20' are provided in stops 19 and 19', these depressions continuing as axial extending depressions 21 and 21', in the outer surfaces of the plugs 18 and 18', whereby bypass channels 20, 21 and 20', 21' are formed between the chamber inside the inner tube 2 and the annular chamber 3, said channels 20, 21 and 20', 21' being constantly open.

A piston 22 or 22' is fastened to the inner end of the piston rod 4 or of the valve push rod 4a, said piston being made approximately in the shape of a cylindrical ring. Pistons 22 and 22' are provided in their cylindrical outer surfaces 23, 23' with a circumferential annular groove 24 or 24', in which a sealing ring 25 or 25' is located, the ring 25, 25' producing a gas-tight seal between the inside wall of inner tube 2 and piston 22, 22'.

Pistons 22 and 22' are provided with a frustoconical bore 26 and 26', said bore corresponding in shape to frustoconical pins 27 and 27' on respectively the inner end of the piston rod 4 and the valve push rod 4a. Short bores 28 and 28' are drilled in the inner ends of the piston rod 4 and the valve push rod 4a coaxially, so that the piston rod 4 and valve push rod 4a are made relatively thin-walled at only this point. After each piston 22 and 22' with its frustoconical bore 26, 26' is fitted onto the frustoconical pins 27 and 27', the edges 29 and 29' are turned over and pressed against the surface of piston 22 or 22', which faces the inner chamber of inner tube 2, thus producing a completely gas-tight conical seat connection between pistons 22, 22' and, respectively, piston rod 4 and valve push rod 4a.

In the axial displacement path of the valve push rod 4a, which is determined essentially by the length a of its outer end 7 which projects from the housing 1, a bypass channel 30 is provided in the inner wall of the inner tube 2, the length of said channel in the direction of axis 5 of the gas spring being only slightly greater than the axial thickness of the corresponding piston 22'. This bypass channel 30, as in the presently illustrated embodiment, can be formed by a bead extending axially or a groove formed at this point. This bypass channel 30, except for the different lengths of piston rod 4 and valve push rod 4a and the different design of outer ends 6 and 7 of, respectively, the piston rod 4 and the valve push rod 4a, is the only asymmetrical part of the entire gas spring.

Manufacture and assembly of the gas spring are extremely simple, since the sealing plugs 8, 8', the pistons 22, 22' and the nature of this connection to piston rod 4 and valve push rod 4a are completely identical. In addition, the piston rod 4 and valve push rod 4a are made from rods of the same diameter. After pistons 22 and 22' are mounted respectively on piston rod 4 and valve push rod 4a, the inner parts 10 and 10' of sealing plugs 8 and 8' are slid onto the piston 4 and valve push rod 4a. Then the seals 13 and 13' are pushed into the outer parts 9 and 9' of the corresponding sealing plugs 8 and 8' and the sealing rings 17 and 17' are placed in the part of the annular groove 16 and 16' located in the inner parts 10 and 10'.

Next the outer parts 9 and 9' of the outer ends 6 and 7 are slid onto, respectively, piston rod 4 and valve push rod 4a. Then pistons 22 and 22', with sealing plugs 8 and 8' already mounted on piston rod 4 and valve push rod 4a, are slid into the two ends of inner tube 2, until the plugs 18 and 18' fit against inner tube 2. This complete unit is then slid into the outer tube which forms cylindrical housing 1. Then the two edges 31, 31' of the outer tube are turned inward, whereby they come to rest against a corresponding stop 32, 32' of the outer parts 9 and 9'. This results in the entire unit composed of inner tube 2, the two inside parts 10, 10', and the two outer parts 9, 9' being pressed together axially, so that these parts are held in an exact position axially. Then in known fashion the gas spring is filled first with several cubic centimeters of lubricating oil and then with compressed gas, which is usually nitrogen.

The operation of this gas spring, known primarily from U.S. Pat. No. 3,656,593, is as follows: when the piston 22 mounted on the valve push rod 4a is in the resting position shown in FIG. 1, in which it rests against the corresponding inner patt 10' of sealing plug 8', no gas can flow from the housing chamber 33 located between the two pistons 22 and 22' in inner tube 2 through the bypass channels 20', 21', annular chamber 3, and bypass channels 20, 21 into the housing chamber 33a between the piston 22 and sealing plug 8. This means that piston 22 and piston rod 4 are in a resting position wherein the total of the applied gas forces and the forces applied externally on piston rod 4 is equal to zero. If these forces acting externally on piston rod 4 should change, piston rod 4 can still move axially relative to housing 1, i.e. in the manner of a relatively stiff spring.

If, as shown in FIG. 2, the valve push rod 4a is slid into housing 1, the piston 22' together with sealing ring 25', together forming a piston sealing element, comes into the vicinity of bypass channel 30, which bridges this sealing ring 25', whereby gaseous communication is provided between the housing chamber 33 and annular chamber 3 via bypass channels 20', 21'. When an appropriate force is exerted on the piston rod 4, gas is pushed from the housing chamber 33 through bypass channel 30, bypass channels 20', 21', annular chamber 3, and bypass channels 20, 21 into housing chamber 33a. When the force exerted on piston rod 4 and directed toward the interior of the housing is smaller than the product of the cross section of the piston rod 4 and the gas pressure prevailing in the housing, the piston rod 4, with its piston 22 following, is pushed out of housing 1, whereby gas flows from housing chamber 33a, through bypass channels 20, 21, annular chamber 3, bypass channels 20', 21' and bypass channel 30 into housing chamber 33.

When valve push rod 4a is released, the latter returns to its resting position as shown in FIG. 1, into which it is pushed by the gas pressure, whereupon the static resting position of piston 22 with piston rod 4 described above is once again produced.

An important area of application of such length-adjustable gas springs is their use as length-adjustable chair columns, as shown and described in U.S. Pat. No. 3,711,054. In order to allow such installation as a chair column, described in detail in this patent, the outer end 6 of piston rod 4, as shown in FIG. 1, can be made in the form of a pin which tapers relative to piston rod 4.

Since the inside parts 10 and 10' do not serve to guide or support piston rod 4 or valve push rod 4a, these parts can be made of metal, for example die-cast zinc, while the outer parts 9 and 9' advantageously consist of an appropriate hard-elastic plastic, since it forms the guide sleeve 11 and 11'. Such an appropriate hard-elastic plastic is an acetal copolymer, (commercially available under the registered trade mark "Hostaform", made by Hoechst AG, Frankfurt-Hoeschst, Germany).

It will be obvious to those skilled in the art that various changes may be made without departing from the scope of the invention and the invention is not to be considered limited to what is shown in the drawings and described in the specification.

What is claimed is:

1. A continuously length-adjustable compressed gas-filled spring, such as for height adjustment of chair seats, table tops or the like comprising an outer cylinder constituting a housing; an inner cylinder coaxially disposed in said outer cylinder, and defining an annular chamber therebetween; a piston mounted coaxially displaceably within said inner cylinder, said piston sealingly contacting the inner wall of said inner cylinder to prevent leakage of said gas across said piston between a first chamber on one side of said piston and a second chamber on the other side of said piston, said piston being connected to a piston rod extending through one end of the housing in a gas-tight manner through a first sealing plug at one end of said cylinders, a second sealing plug to seal the two cylinders at the opposite end in a gas-tight manner; means to provide communication between said first and second chambers separated in a gas-tight manner by the piston on the piston rod, said means comprising a valve including a valve push rod serving as a valve release pin and extending through the other end of said housing in a gas-tight manner through said second sealing plug, a first bypass channel located in the vicinity of said second sealing plug which is in the vicinity of said valve push rod, a second bypass channel located in the vicinity of said first sealing plug, said valve comprising a piston sealing element coaxially displaceably mounted and guided in a gas-tight manner in said inner cylinder on said valve push rod; a bypass depression in the inner wall of said inner cylinder, whereby said valve is opened by moving said piston sealing element axially adjacent said bypass depression to provide gas flow communication between said first and second chambers through said bypass depression, said first and second bypass channels and said annular chamber, and said valve is closed when said piston sealing element is in a position axially spaced from said bypass depression to close said gas flow communication between said first and second chambers.

2. A gas spring according to claim 1, wherein said bypass depression is formed by a bead in the inner wall of said inner cylinder.

3. A gas spring according to claim 1, wherein both said sealing plugs are identical.

4. A gas spring according to claim 3, wherein said piston rod said valve push rod have the same diameter.

5. A gas spring according to claim 1, wherein said piston is identical to said piston sealing element.

6. A gas spring according to claim 5, wherein identical means are provided to fasten said piston to said piston rod and said piston sealing element to said valve push rod.

* * * * *